United States Patent [19]

Lemon et al.

[11] Patent Number: 5,051,454

[45] Date of Patent: Sep. 24, 1991

[54] PHENOLIC RESIN COMPOSITIONS

[75] Inventors: Peter H. R. B. Lemon, Romsey; James G. King, Sholing, both of England; Graham Murray, Edinburgh, Scotland; Henry Leoni, Southampton, England; Arthur H. Gerber, Louisville, Ky.

[73] Assignee: Borden, Inc., Columbus, Ohio

[21] Appl. No.: 450,989

[22] Filed: Dec. 15, 1989

[30] Foreign Application Priority Data

Dec. 22, 1988 [GB] United Kingdom ....... GB 8829984.7

[51] Int. Cl.$^5$ .................. B22C 1/22; C08L 61/10; C08G 8/28; C08G 14/12

[52] U.S. Cl. .................. 523/146; 528/100; 528/126; 528/128; 528/137; 528/140; 528/155; 525/508

[58] Field of Search .......... 523/146; 525/508; 528/155, 100, 126, 128, 137, 140

[56] References Cited

U.S. PATENT DOCUMENTS

| | | | |
|---|---|---|---|
| Re. 32,812 | 12/1988 | Lemon et al. | 523/145 |
| Re. 33,720 | 7/1988 | Lemon et al. | 523/145 |
| 2,007,968 | 7/1935 | Graves | 560/265 |
| 2,091,965 | 9/1937 | Cherry | 525/508 |
| 2,124,285 | 7/1938 | Bucherer | 528/158.2 |
| 2,134,388 | 10/1938 | Cherry | 560/145 |
| 2,541,471 | 2/1951 | Hull et al. | 568/301 |
| 2,544,365 | 3/1951 | Sorenson | 528/158.5 |
| 3,259,469 | 7/1966 | Painter et al. | 568/301 |
| 3,558,560 | 1/1971 | Huck et al. | 266/59 |
| 3,905,934 | 9/1975 | Gardikes | 525/296 |
| 4,395,521 | 7/1983 | Chow et al. | 525/502 |
| 4,426,467 | 1/1984 | Quist et al. | 523/145 |
| 4,468,359 | 8/1984 | Lemon et al. | 264/82 |
| 4,474,904 | 10/1984 | Lemon et al. | 523/146 |
| 4,501,836 | 2/1985 | Makamura et al. | 524/66 |

FOREIGN PATENT DOCUMENTS

| | | |
|---|---|---|
| 0086615 | 8/1983 | European Pat. Off. . |
| 0085512 | 3/1985 | European Pat. Off. . |
| 0189258 | 7/1986 | European Pat. Off. . |
| 474561 | 3/1929 | Fed. Rep. of Germany . |
| 1065605 | 9/1959 | Fed. Rep. of Germany . |
| 1171606 | 6/1964 | Fed. Rep. of Germany . |
| 526968 | 7/1921 | France . |
| 4916793 | 2/1974 | Japan . |
| 50-130627 | 10/1975 | Japan . |
| 62-040948 | 8/1985 | Japan . |
| 62-282743 | 12/1987 | Japan . |
| 63-40636 | 2/1988 | Japan . |
| 1210239 | 10/1970 | United Kingdom . |
| 1391420 | 4/1975 | United Kingdom . |
| 2059972 | 4/1981 | United Kingdom . |
| 2140017 | 11/1986 | United Kingdom . |

OTHER PUBLICATIONS

"Condensation of Phenols with Amines and Formaldehyde", Bruson and MacMullen; Journal of the American Chemical Society, 5/41, pp. 270–272.

"Proton Magnetic Resonance Study on the Structure of Phenol-Formaldehyde Resins", Woodbrey, Higginbottom and Culbertson; Journal of Polymer Science, Part A, vol. 3, pp. 1079–1106 (1965).

Primary Examiner—John Kight, III
Assistant Examiner—Kathryne E. Shelborne
Attorney, Agent, or Firm—Venable, Baetjer, Howard & Civiletti

[57] ABSTRACT

The present invention relates to phenolic resin compositions and methods for making cured phenolic resin compositions. The phenolic resin compositions of this invention comprise an esterified phenolic compound and a base and optionally an unesterified phenolic resole resin. The composition cures in the presence of water or other polar solvent. The esterified phenolic compound contains at least one phenolic hydroxyl group or an esterified phenolic hydroxyl group and further contains at least one esterified methylol group positioned ortho or para to a phenolic hydroxyl group or an esterified phenolic group.

The compounds find particular use in bonding refractory materials, such as sand, in the production of foundry moulds and cores and in treating subterranean formations. These composition have the advantage that cure can be obtained at room temperature without the use of strong alkali. The use of this system also prevents the release of alcohols during the saponification stage of the ester cure process.

45 Claims, No Drawings

PHENOLIC RESIN COMPOSITIONS

This invention relates to phenolic resins. More particularly, it relates to a method of making phenolic resin compositions from esterified phenolic compounds which produce said resin compositions on treatment with alkaline substances. The phenolic resin compositions produced from these esterified phenolic compounds under alkaline conditions have a reduced content of unreactive by-products.

It is known that alkaline phenolic resins may be cured under alkaline conditions through reaction with organic esters, including lactones and organic carbonates. Such ester curing of alkaline phenolic resole resins is described, inter in DE-C No. 1,065,605, DE-C No. 1,171,606, Jp-A No. 49-16793, Jp-A No. 50-130627, GB-A No. 2059975, EP-A No. 0085512 and EP-A No. 0086615. According to these publications, a highly alkaline phenolic resole resin in aqueous solution may be cured at ambient temperature by reaction with an organic ester (including lactones and carbonates) by contacting the resin with the ester in the form of a liquid or a gas.

Such resins find application particularly in the bonding of refractory materials, such as sand, in the production of foundry moulds and cores and in treating subterranean formations. Other applications of the resins, such as in wood bonding, have also been proposed.

The setting of highly alkaline phenolic resins with esters involves the saponification of the ester, but it is a disadvantage with the products heretofore produced that some products of the saponification reaction are not incorporated into the final resin structure but remain in the cured mass as non-resinous compounds, in the form of free alcohol and in the form of the salt of the acid component of the ester. While this is not a serious disadvantage in some of the applications to which the products are applied, the presence of free alcohol and salt in the cured composition is considered to be disadvantageous in other applications for which ester-cured phenolics might be considered, particularly where there is need for high electrical resistance and/or water resistance.

In an attempt to remedy at least part of this deficiency, it was proposed in GB-A No. 2,140,017, to employ a formate or acetate ester of a mono- or polyhydric phenol reactive with formaldehyde as the ester curing agent for hardening alkaline phenolic resole resins. In this case, the ester is obtained by esterifying the phenolic —OH group(s) of the mono- or polyhydric phenol. On mixing this ester with alkaline phenolic resole resin, the ester is saponified as a consequence of the action of the alkali in the resin component. When the ester is saponified, the original phenol which formed the alcohol component of the ester is released and thereby made available for reacting into the resin structure. Since the phenol is reactive with formaldehyde, it also serves to bind any formaldehyde which is uncombined in the resin or is liberated subsequently. The salt of the acid component of the ester in this case remains as a non-resinous byproduct in the cured composition.

It is further characteristic of ester cured phenolic resole systems heretofore produced that they are effective only when a strong alkali is employed. In most practical applications, only sodium or potassium hydroxide produce satisfactory compositions. Phenolic resins produced with weaker bases either cannot be set in a reasonable time using esters, or can be set only by additionally heating to high temperatures.

We have found that these and other disadvantages can be avoided or, at least, substantially reduced by employing phenolic compounds containing esterified methylol phenolic ring substituents, in the presence of a base and a polar solvent in the preparation of a cured phenolic resin composition. By using these esterified phenolic compounds, the release of alcohols during the saponification stage is avoided.

In a first aspect, the present invention provides a method of making a cured phenolic resin composition which comprises reacting (1) an esterified phenolic compound containing one or more phenolic hydroxyl groups and/or one or more esterified phenolic hydroxyl groups and further containing one or more esterified methylol groups positioned ortho and/or para to a phenolic hydroxyl group or esterified phenolic hydroxyl group, (2) an unesterified phenolic resole resin composition and (3) a base, in the presence of water and/or other polar solvent.

The esterified phenolic compound used in the present invention is a phenol or a phenol derivative containing one or more phenolic hydroxyl groups and/or one or more esterified phenolic hydroxyl groups and further containing one or more esterified methylol groups attached to a phenolic ring carbon atom at a position ortho and/or para to at least one phenolic hydroxyl group or to an esterified phenolic hydroxyl group. Thus, it will be understood that the esterified phenolic compound used may be a mono-, a di- or a polyesterified methylolated mono-, di- or polynuclear phenol wherein at least one esterified methylol group is attached to an aromatic ring carbon atom ortho or para to a phenolic hydroxyl group or esterified phenolic hydroxyl group.

By the term "mononuclear phenol", we mean a non-polymeric compound having an aromatic nucleus to which is directly attached at least one hydroxyl group. Examples of mononuclear phenols include, but are not restricted to, phenol itself, homologues of phenol such as o-, m- or p-cresol, 3,5-xylen-1-ol, t-butyl phenol, octyl phenol, n-nonyl phenol, and o- or p-phenylphenol and derivatives of phenol such as resorcinol, 4,4'-dihydroxydiphenyl ether and 4,4'-dihydroxydiphenyl thioether. By the terms "dinuclear phenol" and "polynuclear phenol" we mean compounds formed by the condensation reaction of two or more molecules of a mononuclear phenol with one or more molecules of a phenol-reactive aldehyde or ketone. Examples include, but are not limited to, resinous reaction products of phenol, homologues of phenol or derivatives thereof (for example, o-, m- or p-cresol, 3,5-xylen-1-ol, ethyl phenol, o- or p-phenylphenol, resorcinol, phloroglucinol, pyrogallol, 4,4'-dihydroxydiphenyl, 4,4'-dihydroxydiphenyl ether and (4,4'-dihydroxydiphenyl thio ether) with an aldehyde (such as formaldehyde, acetaldehyde, furfuraldehyde and benzaldehyde, and mixtures thereof) or with a ketone (such as acetone and cyclohexanone). Furthermore, mixtures of aldehyde-reactive phenols, such as mixed cresol isomers, xylenols and phenolic blends such as those obtained from coal tar fractionation and cashew nut shell liquid, can be employed as all or part of the phenol component.

The above-mentioned dinuclear and polynuclear methylol groups are especially useful in the present invention in view of their own ability to form cured resin compositions when reacted with a base in the presence of water and/or other polar solvent. Therefore, according to a second aspect, the present invention provides the use, as a chemical precursor to a cured phenolic resin composition, of an esterified phenolic compound comprising an esterified methylol group-containing derivative of a di- or polynuclear condensation product of a phenol and a phenol-reactive aldehyde or ketone, wherein the said derivative contains one or more phenolic hydroxyl groups and/or one or more esterified phenolic hydroxyl groups and contains one or more esterified methylol groups positioned ortho and/or para to a phenolic hydroxyl group or esterified phenolic hydroxyl group, the said esterified phenolic compound forming a cured phenolic resin composition on reaction with a base in the presence of water and/or other polar solvent. Such an esterified phenolic compound may be used in a method of making a cured phenolic resin composition which comprises reacting the esterified phenolic compound with a base, in the presence of water and/or other polar solvent.

As mentioned above, the phenolic compounds which have use according to the present invention in the production of phenolic resin compositions contain one or more esterified methylol groups located ortho and/or para to a phenolic hydroxyl group or esterified phenolic hydroxyl group. By the term "esterified methylol group" as used herein, we mean an organocarbonyloxymethylene group or substituted derivative thereof. By the term "methylol group" we mean a group of the general formula

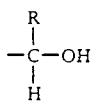

wherein R is H, an aliphatic or aromatic hydrocarbyl or an heterocyclic group.

Typically, the phenolic compounds having use in the various aspects and embodiments of the present invention may be prepared from an appropriate methylol-containing phenol or phenol derivative by reacting the same with an esterifying reagent. The methylol-containing phenol or phenol derivative may be produced by reacting formaldehyde, or other aldehyde (such as acetaldehyde, butyraldehyde and furfuraldehyde), with the appropriate phenol or derivative thereof.

For reasons of availability and reasonable cost, coupled with repeatability and freedom from strong or offensive odors, the preferred type of phenolic compound is one based on a condensation product of phenol and formaldehyde. Such condensation products may be manufactured in known ways by reacting phenol and formaldehyde in the presence of acid or basic catalysts although the production of such products does not form part of this invention. Where basic catalysts are employed for this purpose, the resultant phenol-formaldehyde condensation products (resole resins) will possess free methylol groups in a proportion which will depend primarily upon the ratio of formaldehyde to phenol. These groups are attached to phenolic ring carbon atoms ortho and/or para to the phenolic hydroxyl groups. However, where acid catalysts are employed, the resultant phenol-formaldehyde condensation products do not normally contain methylol groups. Such products may form suitable starting materials, however, if a methylolation step, using formaldehyde under neutral or alkaline conditions, is carried out subsequent to the manufacture of the acid catalyzed condensation product and prior to esterification.

Similarly, where the phenolic compound is a condensation reaction product of a phenol and a phenol-reactive ketone, methylolation will be necessary prior to esterification. Such methylolation can be readily carried out by reaction with formaldehyde under neutral or alkaline conditions.

Of these various methods of preparing the methylol-containing phenol or phenol derivative, we prefer to prepare a phenol-formaldehyde condensation product in the presence of a basic catalyst (i.e. a resole resin) since such avoids the need for a further methylolation step. In such a condensation product, the mole ratio of phenol:formaldehyde will typically be in the range of from 1:1.2 to 1:3.0, preferably from 1:1.5 to 1:3.0. The amount of alkali used as condensation catalyst will typically be about 1-2% by weight based on the weight of the phenol, generally sufficient to maintain a pH of at least 8, but may be considerably higher. The degree of condensation of such a resole resin can conveniently be described by reference to two parameters; the residual solids on heating at 100° C. to constant weight and the viscosity of the resole solution. The resole resins most preferably used as the methylol-containing phenolic derivatives to be esterified to produce the esterified phenolic compounds will have a solids content of from 30 to 95%, preferably 50 to 85%, by weight and a viscosity of from 0.1 to 100 poises, preferably 1 to 25 poises, at 25° C. Typical examples of condensation catalysts include the oxides and hydroxides of sodium, potassium, lithium, barium, calcium, magnesium and amines and ammonia.

The methylol-containing phenol or phenol derivative thus prepared may then be esterified to produce the desired esterified phenolic compound containing one or more esterified methylol groups positioned ortho and/or para to a phenolic hydroxyl group or esterified phenolic hydroxyl group. The esters of the methylol-containing phenols or phenol derivatives contemplated are organic carboxylate esters. these esters may be derivable from any aliphatic, alicyclic or aromatic mono-, di- or polybasic acid capable of forming esters with methylol groups. It is also possible for an esterified methylol-containing phenolic compound to contain ester groups derived from more than one of these acids. For most purposes, however, the esters will be those formed from lower carboxylic acids, especially formic acid and acetic acid. Where reference herein is made to the acid component of the ester group, this is intended only as descriptive of the type of group and it is not intended to indicate that the acid itself need be employed for the manufacture of the methylol ester. In fact, the ester may be formed in any known way and the procedure adopted may be varied, as will be known to those skilled in the art, to suit the particular compounds being produced. Examples of some methods of esterification that may be used include:

(1) reaction of a methylol compound with acid anhydride, mixed anhydride or acid chloride, typically in the presence of a suitable catalyst;

(2) ester exchange between a methylol compound and a suitable carboxylic acid ester in the presence of a suitable catalyst or by acid interchange as described, for example, in U.S. Pat. No. 2,544,365; and (3) treatment of a methylol compound with ketene, diketene or their derivatives.

It is also possible to produce the desired phenolic compounds by the action of an acid anhydride on mono-, di-, or tri-dialkylaminomethyl substituted phenols or phenol derivatives.

Thus in some cases a carboxylic acid anhydride may be employed to esterify the phenolic compound with advantage, instead of the carboxylic acid. Alternatively, the ester may be formed from the corresponding acid chloride. As mentioned above, a preferred phenolic compound having use in the present invention comprises a phenolic resin containing esterified methylol groups. In such a case, it is the methylol-containing phenolic resin that will be esterified. Generally speaking, however, phenolic resole resins are acid sensitive and in most cases it will be necessary to esterify the methylol groups, and optionally the phenolic hydroxyl groups, on a phenolic resin by an indirect route, so as to avoid gelation of the resin. The tendency to gel may be reduced or eliminated by blocking the phenolic —OH group by esterifying or etherifying it, as described, for example, in DE-C No. 474,561. Obviously, any catalyst employed to promote the esterification reaction must not be capable of entering into further reaction with the esterified methylol groups of the product of the esterification reaction under the reaction conditions used. An example of a suitable esterification catalyst is pyridine.

A preferred procedure is to form the acetate ester of methylol-containing phenolic compounds by introducing ketene into a solution of the methylol-containing phenolic compound. In this case, the ketene is preferably generated immediately prior to use, typically in equipment such as that described in U.S. Pat. No. 2,541,471 or U.S. Pat. No. 3,259,469. By reacting the phenolic compound with diketene in a similar way, the acetoacetate ester of the phenolic compound is obtained. Other esters may be formed by ester exchange.

Suitable ester groups include, but are not restricted to formate, acetate, acetoacetate, acrylate, propionate, lactate, crotonate, methacrylate, butyrate, isobutyrate, caproate, caprylate, benzoate, toluate, p-amino-benzoate, p-hydroxybenzoate, salicylate, cinnamate, laurrate, myristate, palmitate, oleate, ricinoleate, stearate, oxalate, succinate, fumarate, maleate, adipate, phthalate, azelate and sebacate. Acetate esters form a particularly preferred class of compounds according to the present invention.

One particular class of methylol esters which is particularly useful is that of the methylol hydroxybenzoates since, on saponification of the ester in the presence of a base, the hydroxybenzoate moiety is, by virtue of its phenolic hydroxyl group, capable of linking into the phenolic resin structure and, by virtue of its carboxylate group, capable or attaching any basic metal ion to the fully cross-linked molecule. Thus, on the saponification of hydroxybenzoate esters of methylol-containing phenolic compounds, in the presence of a base, there is no release either of an alcohol component or of a salt unlike the case with prior art ester curing systems for alkaline phenolic resins. Another class having similar capabilities to hydroxybenzoates comprises the hydroxyphenylalkylcarboxylates which will have the same effect as hydroxybenzoates although hydroxyphenylalkyl carboxylic acids may form esters more easily with methylolated phenolic resins.

These hydroxybenzoate and hydroxyphenylalkyl carboxylate esters form yet a further aspect of the present invention. Accordingly, the present invention provides a phenolic compound having one or more phenolic hydroxyl groups and/or one or more esterified phenolic hydroxyl groups and, at phenolic ring positions ortho and/or para to a phenolic hydroxyl group or esterified phenolic hydroxyl group, one or more groups of the general formula (I)

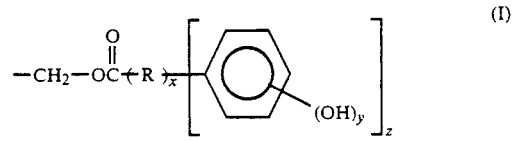

wherein R is a saturated linear or branched lower hydrocarbyl group, x=0 or 1, y=1 to 3 and z=1 or 2, such that when x=0, z=1. A preferred class of phenolic compounds according to this aspect of the invention comprises resinous phenol-formaldehyde condensation products containing two or more substituent groups of the general formula I above at positions ortho and/or para to phenolic hydroxyl groups or esterified phenolic hydroxyl groups in the molecule. Examples of the hydroxybenzoate and hydroxyphenylalkyl carboxylate esters include those derivable from the acids 3,5-dihydroxybenzoic acid, 4-hydroxyphenylacetic acid, 2,4,6-trihydroxybenzoic acid, 4-hydroxybenzoic acid, 4,4-bis(4-hydroxyphenyl) valeric acid, gallic acid and salicylic acid.

The list of suitable ester groups mentioned above includes some ester groups derived from acids which are themselves capable of undergoing polymerization (e.g. acrylate and methacrylate). It is, accordingly, possible to use a phenolic compound, as precursor to a cured phenolic resin, which contains methylol esters of such acids. On saponification in the presence of the base, a polymerizable salt is released which can then be made to polymerize to form a high molecular weight material.

Because phenol-formaldehyde resoles are so unstable and tend to form higher molecular weight materials by condensation polymerization even at ambient temperatures, conditions for esterification are very critical. Therefore, as will be understood from the above, the reaction conditions conventionally employed in the preparation of esters from carboxylic acids and stable alcohols, such as methyl and ethyl alcohols, will not always be suitable in the esterification of the methylol groups attached to aromatic nuclei in phenol-formaldehyde resole resins. Furthermore, the presence of a carboxylic acid may, itself, cause polymerization of low molecular weight phenol alcohols present in a resole composition. Thus it is preferred to add the acid slowly to the resole, so that only mildly acid conditions prevail during the esterification reaction Solvents, such as, ethers or ketones, may conveniently be used, particularly in the case of higher molecular weight resoles, to dissolve the resole and facilitate uniform reaction.

Since the esterification reaction evolves water, it may be accelerated by the use of non-aqueous conditions, as well as by the use of a low-boiling solvent capable of forming an azeotrope with water.

The esters of the present invention are preferably prepared by choqsing conditions which preferentially esterify the —CH₂OH group and not the phenolic —OH group. However, as it is clear from the above, it is within the scope of the various aspects and embodiments of the present invention to use esterified methylol-containing phenolic derivatives wherein some or even all of the phenolic hydroxyl groups themselves are esterified. The latter will generally be slower to react but will also exhibit greater storage stability because of the inactivation of the phenolic —OH group.

Generally, when an acid is used to esterify the phenolic compound, the preferred amount of acid used will be equal, on a molar basis, to the content of free methylol groups. However, in cases where a plurality of methylol groups is present, it is possible to esterify only a proportion of the methylol groups, so that the remaining unesterified methylol groups allow the product to be thermally polymerized at a later stage. This could, for example, be a convenient means of retaining a degree of thermoplasticity in the product.

On the other hand, an excess of acid may be required to induce esterification at low temperature. Ideally, any residual free acid should be removed from esterified methylol-containing phenolic compound before the latter is reacted with a base in the presence of water or other polar solvent to produce a phenolic resin composition since any residual free acid present in the esterified phenolic compound will compete with the esterified phenolic compound for reaction with the base.

As mentioned above, the esterified phenolic compounds react with a base in the presence of water or other polar solvent. Examples of polar solvents that can be used in the present invention instead of water include methanol, ethanol, industrial methylated spirits (IMS), formamide, N,N-dimethyl formamide, dimethylacetamide, triethanolamine and glycerol.

In the application of the present invention to the production of foundry cores and moulds, we have found that the strength of sand cores is improved if part or all of the polar solvent used is a glycol, such as ethylene glycol or diethylene glycol, an ether alcohol, such as methoxyethanol, ethoxyethanol, phenoxyethanol or ethyl digol (i.e. ethylether of diethylene glycol), or a ketoalcohol such as diacetone alcohol. Typical total solvent additions are in the range of from 1 to 50%, preferably 1-30%, by weight based on the total weight of the other components in the composition. The use of a non-aqueous polar solvent will be desirable in applications of the invention where the presence of water could have a deleterious effect on the properties of the final product.

The base used in the present invention may be any material or mixture of materials, which, when added in a suitable amount to the composition comprising an esterified phenolic compound containing one or more esterified methylol groups, renders the composition alkaline which, in the case of aqueous systems, means that the base is one that is capable of rasing the pH of the composition to a value above 7. The amount of base required to achieve this desired alkalinity in the composition largely depends on the identity of the base used and on whether the composition to which the base is added contains any chemical species which are reactive towards the base.

For instance, if the esterified phenolic compound contains any base-reactive chemical groups and/or if the composition containing the esterified phenolic compound additionally contains any base-reactive compounds which groups or compounds would have the effect of neutralizing the base when added, then obviously the base should be used in an amount which is in excess of the amount required to neutralize any such base-reactive chemical groups and/or such base-reactive compounds present. Most inorganic bases and many organic amines are suitable for reacting with the esterified phenolic compounds. The ease with which they saponify the resole esters determines the rate of gelation and the minimum temperature at which gelation occurs.

The base, used to saponify the esterified methylol-containing phenolic compound to form a phenolic resin composition according to the invention may take the form of a gas, a low boiling point liquid or the vapor thereof, a liquid material or a solution of an alkali or a solid. Suitable materials include: (i) oxides and hydroxides of alkali and alkaline earth metals, for example, sodium, potassium, lithium, barium, calcium and magnesium; (ii) oxides and hydroxides of other metals which exhibit alkaline or amphoteric properties, such as zinc oxide; (iii) . ammonia, quaternary ammonium hydroxides, aliphatic alicyclic or aromatic secondary and tertiary amines and Mannich bases, for example, dimethylamine, trimethylamine, triethylamine, N, N-dimethylethylamine, diethylenetriamine, triethylenetetramine, 2,4-bis(dime-thylaminomethyl)phenol and 2,4,6-tris (dimethylaminomethyl)phenol.

All bases tend to accelerate the rate of heat gelation of phenol-formaldehyde resoles but the effect is more pronounced with the esterified resins. Because of the modern emphasis on energy saving, acceleration of heat curing and causing gelation at room temperature are important properties of the materials of the present invention.

The rate of reaction between the base and the esterified methylol containing phenolic compound is affected, inter by the solubility and by the functionality of the base and, where the base is an inorganic alkaline material, by the position of the cation in the electrochemical series According to our findings, in general, the rate of reaction between the base and the esterified methylol containing phenolic compound when the base is a secondary amine is lower than when the base is a tertiary amine, which in turn is lower than when the base is an alkali or alkaline earth metal oxide or hydroxide. We have found that alkali and alkaline earth metal oxides and hydroxides can cause extremely rapid curing of some esterified methylol containing phenolic resole resins at ambient temperature. There are, however, some applications where it may be useful or desirable to have the esterified methylol containing phenolic compound undergo cure only slowly, perhaps only at elevated temperatures, and in such applications the slower reacting secondary and tertiary amines may be used.

There is, a particular application where the use of a Mannich base as the basic material in the present invention gives certain advantages. This is in the production of cured phenolic resins which have a reduced contact of inorganic ions, especially metal cations, and which therefore are more electrically insulating. Furthermore, we have found that the presence of water or other polar solvent is not required for the reaction to proceed in the case where the base used is a Mannich base. Accordingly, the present invention in a further aspect provides a method of making a cured phenolic resin having reduced inorganic ion content which comprises reacting (1) an esterified phenolic compound comprising an esterified methylol group-containing derivative of a condensation reaction product obtained by reacting two or more molecules of a mononuclear phenol and one or more molecules of a phenol-reactive aldehyde or ketone, which derivative contains one or more phenolic hydroxyl groups and/or one or more esterified phenolic hydroxyl groups and containing one or more esterified methylol groups positioned ortho and/or para to a phenolic hydroxyl group or esterified phenolic hydroxyl group, and (2) a Mannich base. Preferably, the Mannich base is 2,4,6-tris (dimethylaminomethyl) phenol.

We have found that when a basic alkaline earth metal compound, especially an oxide or hydroxide of magnesium or calcium, is used (in the presence of water or other polar solvent) to saponify the esterified phenolic compound, a gelled phenolic resin having good gel strength is produced. Thus, in a preferred embodiment, the base used in the present invention will be an oxide or hydroxide of magnesium or calcium. Although we do not wish to be held to any particular theory, it is considered that the high gel strengths obtained by the use of a basic alkaline earth compound result, at least partly, from an electronic "bridging" interaction between the bivalent alkaline earth metal ion and the hydroxyl groups of the phenolic materials. This appears to induce extra coupling between the phenolic resin molecules thereby affecting a harder gel. This effect is surprisingly not restricted to esterified phenolic compounds comprising di- or polynuclear phenols containing a plurality of esterified methylol groups but is also seen when the esterified phenolio compound is a mononuclear phenol, as described earlier, which contains one or more esterified methylol groups. Thus, in a further aspect, the present invention provides a method of making a phenolic resin composition comprising reacting a phenolic compound comprising an esterified mononuclear phenol containing one or more phenolic hydroxyl groups and/or one or more esterified phenolic hydroxyl groups and further containing one or more esterified methylol groups attached to the aromatic ring at a position ortho and/or para to a phenolic hydroxyl group or esterified phenolic hydroxyl group with a basic alkaline earth metal compound in the presence of water and/or other polar solvent. The present invention also provides the use, as a chemical precursor to a gelled phenolic resin, of an esterified mononuclear phenol containing one or more phenolic hydroxyl groups and/or one or more esterified hydroxyl groups and further containing one or more esterified methylol groups attached to the aromatic ring at a position ortho and/or para to a phenolic hydroxyl group or esterified phenolic hydroxyl group, the said esterified mononuclear phenol forming a gelled phenolic resin on reaction with a basic alkaline earth compound in the presence of water and/or other polar solvent.

Normally, the base will be employed in an amount which is chemically (stoichiometrically) equivalent to the ester group content of the phenolic compound (±10%). However, for some applications it might be necessary or desirable to keep free ester present and for others, an excess of base may be present. In the case where the base used in the present invention is an alkali metal compound, the molar ratio of total phenol: total alkali metal in the say composition will typically be within the range of from 1:0.3 to 1:1.4. The use of any higher ratio may result in too fast a reaction while ratios lower than 0.3 mole of alkali per mole of phenol may leave unreacted ester and, therefore, give lower final strengths. Preferably, the polar ratio of total phenol: total alkali in the composition will be in the range of from 1:0.5 to 1:1.1.

From the above, it will be understood that relatively mild bases, e.g. calcium or magnesium hydroxide, can be used to saponify the esterified methylol-containing phenolic resins which, upon saponification at room temperature, form cured phenolic resin compositions. As mentioned previously, such relatively weak bases do not give satisfactory compositions at room temperature when used in the prior art ester curing of alkaline phenolic resins. Since these relatively mild bases form salts with the acid component of an ester released on saponification of the esterified methylol-containing phenolic compound which salts are less soluble than the corresponding sodium or potassium salts, the use of relatively mild bases in the present invention makes it possible to form phenolic resin compositions having reduced water extractability.

In the first aspect of the invention described earlier, the esterified phenolic compound is reacted with an unesterified phenolic resole resin composition and a base in the presence of water and/or other polar solvent. The esterified phenolic compound will be used in the performance of this first aspect of the present invention in an amount typically from 10–120% by weight based on the weight of the unesterified phenolic resole resin. Preferably, the amount of esterified phenolic compound used will be from 30–80% by weight of the unesterified phenolic resole resin.

Resole resins are produced by the reaction of a phenol and a molar excess of a phenol-reactive aldehyde typically in the presence of an alkali or alkaline earth metal compound as catalyst. Methods of making phenolic resole resins are well known and do not need to be described in detail here. Typically, the resole resin will be a phenol-formaldehyde resin produced by reacting phenol and formaldehyde in a molar ratio (phenol:formaldehyde) within the range of from 1:1 to 1:3. The unesterified phenolic resole resin will usually be used in solution, especially as an aqueous solution of the alkali metal salt of the phenol-formaldehyde resole resin.

According to the various aspects. and embodiments of the invention, other additives may also be incorporated with the esterified phenolic compound, the basic material and/or with the aqueous or polar solvent. Particularly useful are solutions of materials which could co-react with the esterified methylol-containing phenolic compounds or with the phenolic materials resulting from the saponification of the esters. In addition to the aqueous solutions of alkali metal salts of phenolic resole resins already mentioned, one might advantageously incorporate with the other components a polymeric material such as polyvinyl alcohol, cellulose and casein. Furthermore, a silane, such as gammaaminopropyl triethyoxy silane, may also be incorporated to promote adhesion, particularly in applications such as the production of foundry moulds and cores where the phenolic resin is used as a binder for a granular refractory material.

In yet a further embodiment of the invention, an unesterified phenolic resole may be combined with alkali and water and mixed with an esterified methylol-containing phenolic resin at the time of use. Such a procedure can result in almost instantaneous gelation, even at room temperature. Consequently, this procedure may conveniently be employed in processes such as the so-called "separate application process" for bonding surfaces. In this process, a first component of a system comprising two mutually reactive ingredients, is applied in a thin film to one of the surfaces to be bonded, while the second component is applied to the mating face. Bonding is effected by bringing the two surfaces quickly together under pressure. This process has the advantage that working life constraints are overcome while retaining short setting times at low temperatures. In the above embodiment in accordance with the invention, the second component is conveniently an aqueous, alkaline solution of a phenol-formaldehyde resole resin, preferably in the form of a solution in aqueous potassium or sodium hydroxide.

As is well-known in the phenolic resin art, in some applications rapid cure of a phenolic resin may be a disadvantage and steps are taken to slow down and control the rate of curing of the phenolic resin. For example, in the production of foundry moulds and cores from a foundry sand composition containing a resin binder and a curing agent for the resin, the sand composition must have a sufficiently long bench life, i.e. it must remain workable for a sufficiently long time to enable the moulds or cores to be made. It may, however, be the case that an esterified methylol containing phenolic resole resin cures too rapidly in the presence of a base and water or other polar solvent to be workable for a sufficiently long time for some such applications. This problem can be overcome by using a combination of an esterified methylol containing phenolic resole resin and a conventional ester curing agent to cure an unesterified phenol-formaldehyde resole resin under alkaline conditions. It seems that the rate of curing of the unesterified resole resin by the phenolic ester may be slowed down and, therefore, controlled by the simultaneous use of conventional ester curing agents, such as diacetin, triacetin, ethylene glycol diacetate, propylene glycol diacetate, butylene glycol acetate, organic carbonates (e.g., propylene carbonate) and lactones (e.g., propiolactone, butyrolactone, valerolactone and carprolactone). In order to ensure homogeneity in the reaction mixture, the esterified methylol containing phenolic resin would be added to the mixture as a solution in the conventional ester curing agent.

In addition to the remarkable speed of reaction that may be achieved using the esterified methylol containing phenolic resins and their ability to undergo gelation at room temperature in the presence of weaker bases than those required by the phenolic resoles cured with separate esters of the prior art, the compositions in accordance with the invention have a number of other properties which clearly distinguish them over the compositions known hitherto.

The known products produced by employing a separate ester to cure alkaline phenolic resoles are invariably of a dark red color. Using the process of the invention, almost colorless or white or light colored products may be produced. This is of significance in certain applications of the present invention where the products are required to have an aesthetic appeal, for instance in many surface coating applications, decorative castings, adhesives for laminates and adhesive applications where there is a possibility of "billed-through" to a visible surface. While acid phenolic resins of light color have previously been produced, with the limitations that this introduces, we believe that this property has not previously been obtained with alkaline phenolic resins.

The esters of methylolated phenolic resins are generally insoluble in water. We have found, however, that the curing reaction with bases does not take place or takes place less rapidly or less completely in the absence of water or other polar solvent which is necessary for the initial saponification step. Thus, according to another embodiment, the invention provides a composition comprising an esterified methylol-containing phenolic resin, in an essentially anhydrous condition, and an essentially anhydrous base, such as calcium oxide or magnesium oxide, which composition is capable of forming a cured phenolic resin composition when contacted with water. A rapid reaction may be initiated by contacting the anhydrous mixture with water. This contact with water can be brought about by the use of moist air or steam. It will be understood, therefore, that this forms the basis of a gas or vapor-curing technique for the cure of phenolic resin compositions. This embodiment has a practical application in the production of moisture-curable surface coatings.

A further application of the present invention which makes use of the ability of a composition comprising a mixture of an esterified methylol containing phenolic resin in an anhydrous condition and an anhydrous base to form a cured phenolic resin when contacted with water vapor or steam is in the production of foundry moulds and cores. Thus, according to yet a further embodiment the present invention provides a method of making a foundry mould or core which comprises mixing a granular refractory material containing substantially no moisture with an amount effective to bind said granular refractory material of an anhydrous esterified methylol containing phenolic resin and with an amount effective to saponify said esterified methylol containing phenolic resin of an anhydrous base, forming the mixture into the desired shape and then passing water vapor and/or steam through the shaped mixture whereby the base and the esterified methylol containing phenolic resin react together in the presence of moisture to form a cured phenolic resin which binds the granular refractory material. In this embodiment, the granular refractory material is typically a foundry sand which is substantially dehydrated prior to being mixed with the other components. Many types of sand conventionally used in the production of foundry moulds and cores are themselves basic and if such alkaline sands are used in the embodiment of the present invention described above, a separate addition of an anhydrous base may be omitted from the mixture used to make the foundry mould or core. As stated above, in order to bring about the cure of the phenolic resin, the mixture is gassed with water vapor and/or steam. Gassing will typically be achieved by sucking steam and/or water vapor obtained from a steam generator through the shaped mixture of sand, esterified resin and base in a core box, fitted with perforated plates, by means of a vacuum applied at one of the perforated plates. Unlike other gas curing techniques used in the production of foundry moulds and cores, the embodiment of the present invention described above avoids the use of noxious, flammable and relatively expensive gassing catalysts to effect the cure of the phenolic resin binder.

The compositions of the invention, as described above, have many various applications including coatings, castings, binders for foundry use, refractory binders and adhesives for wood and metal components. Furthermore, compositions can be foamed according to techniques known in the art.

In the case of foundry mould or core manufacture, a major amount of a granular refractory material, such as sand, may be mixed with a minor amount of an unesterified phenolic resole resin and an esterified phenolic compound as herein described in the presence of a base and water and/or other polar solvent whereby the unesterified phenolic resole resin and the esterified phenolic compound react to produce a cured phenolic resin composition which binds the granular refractory material. Typically, though not essentially, the amount of unesterified phenolic resole resin used will be in the range of from 0.1 to 10% by weight based on the weight of the granular refractory material and the amount of esterified phenolic compound used will be in the range of from 10 to 120% by weight based on the weight of the phenolic resole resin. Where the esterified phenolic compound is an esterified methylol group—containing derivative of a di- or polynuclear condensation product of a phenol and a phenol-reactive aldehyde or ketone, it is possible to make foundry moulds or cores according to the above without the need for an unesterified phenolic resole resin. In such a case, the amount of esterified phenolic compound used will, in general though not essentially, be in the range of from 0.1 to 10% by weight based on the weight of the granular refractory material. It will be appreciated that the actual amount of phenolic resin (whether unesterified or containing esterified methylol groups) required for addition to the granular refractory material will depend on a number of factors including the molecular weight of the resin, the nature of the esterified phenolic compound and the type and amount of base.

For use in illustrating the invention, the following esters were prepared:

Products A to E are phenol-formaldehyde compounds and resins containing methylol groups.

Products I to XI are examples of esters manufactured from the methylolated compounds using various reagents and procedures.

Examples 1 to 12 and Application Examples 1 to 8 illustrate the invention and exemplify the polymerization of the phenolic esters in the presence of alkaline materials.

PREPARATION OF THE METHYLOLATED PRODUCTS FOR ESTERIFICATION

PRODUCT A - SALIGENIN

Saligenin (orthomethylol phenol, 2-(hydroxymethyl) phenol)

This product was used as purchased from Aldrich Chemical Company

PRODUCT B - PHENOL-FORMALDEHYDE RESOLE (MOLAR RATIO F:P=1.6:1; SOLIDS=70%)

Phenol (1 mol) and 50% formalin (0.6 mol) were charged to a reaction vessel and the temperature maintained below 40° C. whilst sodium hydroxide (0.004 mol) was added. The temperature was then raised to 80° C. The temperature was maintained at 80° C. while a second charge of 50% formalin (1.0 mol) was added slowly over 30 minutes and the temperature maintained at 80° C. for a further 15 minutes. The mixture was then held at 70° C. for a further 30 minutes. The pH was adjusted with p-toluene sulphonic acid solution to 4.0 +/−0.2 and the volatiles distilled off under vacuum at 70° C. to a viscosity of 80 centistokes at 25° C. The resin was cooled to 60° C., the pH adjusted to 6.2 +/−0.02 with sodium hydroxide, 0.027 moles of urea were added and the product further concentrated to a final viscosity of 500 cP at 25° C., cooled and discharged.

PRODUCT C - PHENOL-FORMALDEHYDE RESOLE (MOLAR RATIO F:P=2.5:1; SOLIDS=77%

Phenol (1 mol) and 50% formaldehyde (0.6 mol) were charged to a reaction vessel and the temperature held below 40° C. while magnesium oxide (0.03 mol) was added and well dispersed. The temperature was then allowed to rise to 70° C. over 30 minutes and maintained at this temperature while a second charge of 60% formaldehyde (1.9 mol) was added slowly over one hour and then held for a further 30 minutes. The temperature was then lowered to 55° C. and vacuum distillation commenced until a viscosity of 85 cSt at 25° C. was obtained, the temperature was then raised once more to 80° C. and held for one hour, the resin was then cooled to 65° C. and held until the water dilutability reached 1:4 at 25° C. The product was then cooled to room temperature and discharged.

PRODUCT D - PHENOL-FORMALDEHYDE RESOLE (MOLAR RATIO F:P=2.0:1; SOLIDS=65%

Phenol (1 mol) and 50% formaldehyde solution (0.6 mol) were charged into a reaction vessel and the temperature held at 44° C. while 50% sodium hydroxide (0.04 mol) was added. The mixture was then heated to 80° C. and a second charge of 50% formaldehyde solution (1.4 mol) was added slowly over a period of 25 minutes. The mix was then held at 80° C. until the viscosity reached 550 cP (about 6 hours). The product was finally cooled to room temperature and discharged.

PRODUCT E PHENOL-FORMALDEHYDE RESOLE (MOLAR RATIO F:P=1.81:1; SOLIDS=60.5%

A reactor was charged with 1,061.9g (11.30 moles) of phenol and 95.55g (0.768 moles) of a 45% aqueous solution of potassium hydroxide. This mixture was heated to 60° C., then 1,225.7 g (20.43 moles) of warm, 50% aqueous formaldehyde was added over 30 minutes, while the temperature of the reaction mixture rose to 105° C. The reaction mixture was then cooled and held at 75° C.-80° C. until a Gardner viscosity (25° C.) of T-U (approximately 600 centistokes) was attained.

The resin solution was then rapidly cooled to room temperature. The yield of resin solution was 2263 g. The water content as determined by Karl Fisher titration was 32.1%. The free phenol content was 2.3%. The solids content, as determined by oven drying at 135° C., was 60.5%. The product was a resole made from a reaction mixture having a F:P molar ratio of 1.81:1 and a potassium:phenol (K:P) molar ratio of 0.068:1.

ESTERIFICATION OF THE METHYLOLATED PHENOLIC COMPOUNDS

PRODUCT I - SALIGENIN MONOACETATE

Acetic anhydride (59 g, 0.58 mol) was mixed with pyridine (50 g) and Product A (72 g, 0.58 mol) added slowly with stirring and cooling to prevent the temperature exceeding 50° C. The mixture was allowed to stand overnight at room temperature and then poured into a large excess of cold water. Diethyl ether was added and the reaction product extracted then washed with water, 1% hydrochloric acid and again with water.

The organic layer was dried and the ether removed under vacuum leaving a pale yellow oil.

PRODUCT II - SALIGENIN METHACRYLATE

Product A (13.5 g, 0.11 mol) was dissolved in pyridine (8.6 g) and dichloromethane (200 ml). Methacryloyl chloride (11.4 g, 0.11 mol) in dichloromethane (50 ml) was added slowly with stirring, whilst the temperature was maintained below 40° C. The mixture stood for a further hour and was then refluxed for 20 minutes. The product was cooled, washed with water, dilute acid and water again, dried over anhydrous sodium sulphate and evaporated under vacuum to remove the solvent.

PRODUCT III - FORMULATED PRODUCT B

Formic acid (46 g) and acetic anhydride (102 g) were slowly mixed while the temperature was held below 45° C. The mixture was left to stand for one hour at 45° C. and then cautiously added to a mixture of Product B (100 g) plus pyridien (7.9 g) while immersed in an ice-/water bath to hold the temperature below 20° C. The mixture was then allowed to stand overnight at room temperature. Ethyl acetate was then added to the mixture, which was washed several times with water, then with dilute acid and finally with water again, the organic phase was dried, filtered and evaporated to dryness. A viscous, straw-colored liquid (Product B formate) was obtained.

PRODUCT IVa - PARTLY ACETYLATED PRODUCT C

Product C (50 g) and pyridine (75 g) were mixed and acetic anhydride (25 g) added cautiously with stirring, the temperature being maintained below 40° C. The mixture was left overnight and then poured into a large excess of iced water. Ethyl acetate was added and the product extracted, washed with water several times, dilute acid and finally water again. The organic layer was dried and the solvent removed under vacuum.

PRODUCT IVb - HIGHLY ACETYLATED PRODUCT C

The procedure described for the preparation of Product IVa was repeated but using Product C (50 g), pyridine (75 g) and acetic anhydride (50 g).

PRODUCT IVc - ACETYLATED PRODUCT C (USING KETENE)

Product C (phenol-formaldehyde resole of F:P molar ratio 2.5:1) (400 g) was dissolved in acetone (100 ml) and stirred continuously while ketene, generated in situ with a ketene lamp, was passed for 6 hours at 0.5 mol per hour. The product was extracted into ethyl acetate, washed with water several times, then with dilute acid and finally with water again. The organic layer was dried and the solvent removed under vacuum. A saponification value of $6.3 \times 10^{-3}$ mol per gram was obtained.

PRODUCT V - FORMULATED PRODUCT C

The procedure described for the preparation of Product III was followed except that Product C (200 g) was used in place of Product B.

PRODUCT VI - ACETYLATED PRODUCT D (USING KETENE)

Product D (90 g) was dissolved in acetone (100 ml) and stirred continuously while ketene (generated in situ using a ketene lamp) was passed for 2 hours at a rate of 0.5 mol per hour. The product was extracted into ethyl acetate, washed with water several times, then washed with dilute acid and the washed again with water. The organic layer was then dried and the solvent removed under vacuum.

PRODUCT VII - SALIGENIN SALICYLATE

Thionyl chloride (1 mol) in dichloromethane (400 ml) was added dropwise and with constant stirring to a dispersion of sodium salicylate (1 mol) in dichloromethane (800 ml). The mixture was stirred for a further hour, then left to cool to room temperature, care being taken to avoid absorption of atmospheric moisture. This solution was then added dropwise and with vigorous stirring to a solution of Product A mol) and pyridine (2 mol) in dichloromethane (1200 ml). After addition was completed, the mixture was heated to 40° C., held at this temperature for 10 minutes and then allowed to cool. The reaction mixture was then washed several times with water and dilute acid until no traces of pyridine remained. The organic phase was then dried over anhydrous sodium sulphate, filtered and stripped of solvent to obtain saligenin salicylate in 60% yield.

PRODUCT VIII - SALIGENIN DIACETATE

Acetic anhydride (82.3 g, 0.806 mol) was mixed with pyridine (130 g) and Product A (50 g, 0.403 mol) added slowly with stirring and cooling to prevent the temperature exceeding 50° C. The mixture was allowed to stand overnight at room temperature and then poured into a large excess of cold water. Diethyl ether was added and the reaction product extracted, washed with water, then washed with 1% hydrochloric acid and then again washed with water. The organic layer was dried and the ether removed under vacuum leaving a pale yellow oil.

PRODUCT IX -DIACETATE OF 2.6-DIMETHYLOL-p-CRESOL as compared to the theoretical possible gain of 2.5 g. The recovered methyl formate was returned to the flask, and the contents of the flask were permitted to stand for three days at ambient (room) temperature. The volatiles were then stripped off until the flask weight remained constant. The yield of nonvolatile, wet solid product was 6.8 g, for a total gain of 1.8 g. Assuming that there were no side reactions, this represented an approximately 70% conversion.

Upon treatment of a sample with 20% caustic in N,N-dimethyl acetamide, the product sample became heterogenous and eventually separated into two layers. The upper layer was light amber in color and was about twice the volume of the lower layer. The lower layer was almost colorless. The top layer had a consistency similar to that of medium pancake syrup.

EXAMPLES OF COMPOSITIONS IN ACCORDANCE WITH THE INVENTION

In the following examples, where the Shore D gel hardness is quoted, this was measured using a Bareiss Shore D hardness meter (Bareiss AG, 7938 Oberdisdingen, Germany) as described in DIN 53 505(ISO Standard R 868). An approximate gelation time was obtained by mixing 4.0 grams of the esterified phenolic with appropriate amounts of alkaline material and water (where used) and observing the time taken to form a gel.

The observation was made, unless otherwise stated, at an ambient temperature of about 20° C.

EXAMPLE 1

About 10 g of Product IVa (acetylated Product C) was mixed with 5 ml of 45% potassium hydroxide solution. This gave a gel time of 30 seconds and a hardness after 26 hours at 20° C. of 45–50.

For the purpose of comparison, 10.0 g of Product C containing 1.8 g of water was mixed with 3.2 ml of 70% aqueous potassium hydroxide solution and 3 g of triacetin. This gave a gel time approximately 24 hours and a hardness of less than 10 after 170 hours.

The faster gelation time and increased hardness of the acetate ester of Product C over Product C with separate ester shows the advantages of the product in accordance with the invention over the product in accordance with the prior art.

EXAMPLE 2

About 4.0 g of Product C acetate ester (Product IVa) mixed with 1.04 of calcium oxide and 1 g water gave a gel time of 30 seconds and a hardness of 75 after 170 hours at 20° C.

By comparison, it was difficult to stir calcium oxide into a mixture of Product C and triacetin, since small lumps were produced. A non-homogeneous product containing lumps of gel in liquid resin was obtained.

The present invention shows the advantage that alkaline earth metal alkalis may be used to produce useful products. Indeed the gelled material produced in this example shows a greater hardness than that shown in Example I and this is thought to be due, in part to some kind of electronic interaction between the bivalent metal and the hydroxy groups in the phenolic compounds. This appears to induce extra coupling between the phenolic resin molecules thereby effecting a harder gel.

EXAMPLE 3

About 4 g of saligenin monoacetate (Product I) was mixed with 0.67 g calcium oxide and 0.5 g water added. A gel time of 60 seconds was obtained and a hardness after 144 hours of 34.

This model compound, because of the low F:P ratio and relatively low molecular weight would not be expected to form a gelled product through the reactions of the methylol groups alone. By using calcium oxide as the alkaline curing agent a respectable gel strength is obtained, again illustrating the advantage of employing bivalent metal alkalis.

EXAMPLE 4

About 4.0 g of Product C acetate ester (Product IVa) mixed with 0.77 g of magnesium oxide and 1 g water gave a gel time of 10–12 hours but had a hardness of 65–70 after 170 hours at 20° C.

The high hardness of the product again indicates a contribution from electronic interactions of the bivalent metal and the hydroxy groups of the phenolic materials. Examples 2 and 4 illustrate an important feature of the invention, which is the ability to adjust the reactivity of the system by employing different alkalis as curing agents, whilst at the same time maintaining a product of useful hardness.

EXAMPLE 5

About 4 g of Product C formate ester (Product V) mixed with 0.75g calcium oxide and 0.5g water gave a gel time of 1 minute and a hardness of 75–80 after 96 hours at 20° C.

The diacetate of 2,6-dimethylol-p-cresol (DMPC) was prepared by reacting 3.4 g of the dimethylol cresol with 4.8 g of acetic anhydride in the presence of 7.8 g of tetrahydrofuran.

After 66 hours at room temperature, the reaction solution was diluted with 5 g of methylene dichloride, then washed several times with 15 ml of cold water. An organic layer of about 10 g was dried with 2 g of 10 anhydrous sodium sulphate.

PRODUCT X - DIACETOACETATE OF 2,6-DIMETHYLOL-PARA CRESOL (DMPC) USING DIKETENE

A reaction vessel was charged with 3.45 g (0.02 mols) of DMPC in 5 g of tetrahydrofuran and 0.1 g of anhydrous sodium acetate. After these ingredients were charged to the reactor, 3.4 g (0.04 mols) of diketene was added. This mixture was stirred while maintaining it at 25°–35° C. by means of a water bath, for about 4 hours. At the end of this time, the reaction mixture was essentially homogeneous. The resulting product was the di(acetoacetic) ester of DMPC.

PRODUCT XI-SALIGENIN FORMATE

Saligenin formate was produced by the reaction of saligenin with methyl formate. Thus 5.0 g of saligenin and 20 g of methyl formate, together with 0.1 g of imidazole, were charged to a reactor flask that was equipped with a stirring bar. The mixture was allowed to stand at ambient temperature for two days.

Mild vacuum was then applied to the reaction mixture at room temperature, as the mixture was agitated using the stirring bar, to strip off volatiles. The yield of nonvolatile product was 6.3 g, a gain of 1.3 g Comparison with Example 2 shows that the acid function of the ester may be varied without compromising the hardness of the gel produced.

EXAMPLE 6

About 4 g Product C acetate ester (Product IVc) was mixed with 1.5 g calcium oxide and varying amounts of water.

| WATER ADDED | GEL TIME |
| --- | --- |
| 0.28 g | 30 seconds |
| 0.036 g | 45 minutes |

The present invention allows the reactivity of the system to be varied by the addition of water or other suitable polar solvent.

EXAMPLE 7

About 4 g Product B formate ester (Product III) mixed with 1.5 g 2,4,6-tris(dimethyl aminomethyl)-phenol gave a gel time of 2–3 minutes and a hardness of 60 after 72 hours.

In a different experiment, 4g of Product III were mixed with 1.5ml of a 35% ammonia solution (aqueous). The reaction mixture set in 1 minute from 20° C. with mild exotherm to form a soft gel.

EXAMPLE 8

4 g saligenin methacrylate (Product II) mixed with 0.58 g calcium oxide followed by 0.5 g water gave a gel time of 1 minute and a hardness of 50-60 after 24 hours.

In a different experiment, 4g of Product III were mixed with 1.5 mol of a 35% ammonia solution (aqueous). The reaction mixture set in 1 minute from 20° C. with mild exotherm to form a soft gel.

EXAMPLE 9

About 4 g of Product C taken to different degrees of acetylation (Products IVa and IVb) when mixed with 0.75 g calcium oxide and 0.5 g water gave gel times of 30 seconds and 3 minutes respectively.

The degree of esterification may be used to vary the properties of the system as required.

EXAMPLE 10

Table 1 illustrates the improvement in resistance to extraction by water obtained from the gelled resin through the use of the compositions in accordance with the invention, as contrasted with a prior art alkaline phenol-formaldehyde resin cured in a typical manner with a conventional ester.

In carrying out the tests, samples of the materials under test were gelled and allowed to cure for 10 days at 20° C., after which they were ground and sieved to provide powders within the range 300 to 600 microns. The powders were then stirred into 100 ml of deionized water and refluxed for 3 hours. At the end of this time, the powdered material was filtered off, weighed in a tared sintered glass filter crucible and dried to constant weight at 100° C. The samples were then further extracted in a similar way but replacing the water with acetone.

Resin 1 was KOH-catalyzed phenol-formaldehyde resole having an F:P molar ratio of 2.0:1, a K:P molar ratio of 0.745:1 and a solids content of 63.5% by weight. The first entry in the following table is for purposes of comparison only and employs triacetin (30 grams on 100 grams of resin) as curing agent. The second entry shows the improvement brought about by employing the same resin in accordance with the invention, using saligenin diacetate in place of triacetin as the curing agent.

Thus, 3.4 g of the resin Product E was mixed with 1.0 g water and 0.6 g 45% KOH solution, and cooled to room temperature and then quickly mixed with 1.0 g of Product IX. This mixture became immobile in about 30 seconds, at ambient temperature.

EXAMPLE 12

An alkaline phenol-formaldehyde resin was made in accordance with the teaching of U.S. Pat. No. 4,474,904. This resin was characterized by a formaldehyde/phenol mole ratio of 1.8, a potassium/phenol mole ratio of 0.63 and a solids content of 50% by weight.

About 0.6 g of the solution of 2,6-dimethylol-p-cresol diacetate obtained in Product IX having a concentration of about 50% was evaporated with an air stream to produce 0.3 g of an oily residue. Tho this residue was added 1.2 g of the alkaline phenol-formaldehyde resin described above. The resin immediately gelled.

EXAMPLES OF APPLICATIONS

Application Example 1 - 2-Part Surface Coating

About 4.0 g of Product C acetate ester (Product IVc) was mixed with 0.77 g of magnesium oxide and 1 ml of water and the mixture immediately painted onto wood and mild steel surfaces. The residual material did not gel for 10 hours at 20° C. but the coating produced had reached a pencil hardness of 2B after 24 hours and HB after 1 week at 20° C.

Application Example 2 - Moisture-curing surface Coating

About 4.0 g of Product C acetate ester (Product IVc), which was substantially dehydrated, were mixed with 0.75 g of calcium oxide and spread onto wood and mild steel surfaces and allowed to stand in an atmosphere of high humidity at room temperature. Although the material in bulk was still liquid after 3 days, the coating had hardened to a glossy opaque finish after 10 hours at 20° C. On the mild steel surface, the coating had reached a pencil hardness of HB after 24 hours and after 1 week at 20° C., exceeded H.

Application Example 3 - Moisture-curing Foundry Cores

About 15 g of the acetate ester of Product D (substan-

| RESIN | WEIGHT | BASE | ESTER | AMOUNT OF ESTER | % WATER EXTRACT | % ACETONE EXTRACT |
|---|---|---|---|---|---|---|
| RESIN 1 | 10 g | KOH | TRIACETIN | 3 g | 60.2 | 5.3 |
| | (Gel time = 8-10 minutes, hardness = 50-55 after 96 hours at 20° C.) | | | | | |
| RESIN 1 | 10 g | KOH | SALIGENIN DIACETATE | 3 g | 55.6 | 4.0 |
| | (Gel time = 10 minutes, hardness = 60-65 after 240 hours at 20° C.) | | | | | |
| RESIN 1 | 10 g | KOH | SALIGENIN SALICYLATE | 4.1 g | 48.1 | no result |
| | (Gel time = 2 days, hardness = 60 after 240 hours at 20° C.) | | | | | |
| Produce IVa | 10 g | CaO (4 g) | — | — | 30.2 | 3.2 |
| | (Gel time = 10 seconds, hardness = 70-80 after 96 hours at 20° C.) | | | | | |
| Product IVa | 10 g | CaO (3 g) | — | — | 34.0 | no result |
| | (Gel time = 10 seconds, hardness = 70-80 after 96 hours at 20° C.) | | | | | |
| Product VI | 10 g | CaO (4 g) | — | — | 42.2 | 3.1 |
| | (Gel time = 20 seconds, hardness = 70-80 after 96 hours at 20° C.) | | | | | |

EXAMPLE 11

In this example, the diester, Product IX, was evaluated as a crosslinker for an alkaline phenolic resole. It proved to be very effective.

tially dehydrated but containing 18% acetone) (Product VI) was mixed with 1 kg of Chelford 50 silica sand in a Ridsdale laboratory core sand mixer for 30 minutes. 4.5 g of calcium oxide was added and mixed for 1 minute.

The mix was rammed into an AFS green compression core box fitted with perforated plates.

A steam generator was employed with vacuum applied to the bottom plate to suck water vapor through the core. After passing steam for 30 seconds the core had hardened sufficiently to enable it to be stripped from the mould. The core was hot to the touch, so that cure was also accelerated by heat After standing for 2 hours at 20° C., the core had a compression strength of 250 kN/m².

Although it is recognized that the strength is poor by conventional standards, it serves to illustrate that the principle of water curing is a sound one, confirmed by Example 6 and the surface coating of Example 2. The mix had stiffened and dried out after 30 minutes at 20° C., so that it was no longer useable, largely through the evaporation of the acetone. A core produced by this technique was immersed in cold water for 1 hour. Although softened slightly, it retained its shape, thus indicating that a significant degree of cure had been achieved.

Application Example 4 - Refractory Bonding

The following samples of gelled material were submitted to thermal gravimetric analysis at 750° C. in air and nitrogen atmospheres. The results are shown in the following Table.

Application Example 5 - Foam

About 4.0 of the formate ester of Product C were mixed with 0.5 g of magnesium oxide, 0.1 g of surfactant DC193 (a commercially available product of Dow Corning Corporation believed to comprise a silicone glycol polymer) and 1 g of Arcton II ("Arcton" is a registered Trademark) which is a commercially available chlorofluorocarbon blowing agent of ICI Chemicals & Polymers Ltd). Finally, 0.5 g of water was added. An exothermic reaction occurred after about 30 seconds, the mixture creamed and foamed and soon after gelled. After standing, the foam was found to have a density of 200 kg/m³, was strong and contained some closed cells.

Application Example 6 - Self-curing

A small cylindrical casting was produced from the composition of Example 4 and left to cure for 6 weeks at 15-20°C. It gave a compression strength of 9,900 pounds per square inch when tested on a Monsanto tensometer. The product exhibited good dimensional stability and is useful for casting applications for which conventional acid-set phenolics are commonly used.

Application Example 7 - Foundry Core Mix

About 30 g of Resin 1 (see Example 10 above) were mixed with 2000 g of dry Chelford 50 silica sand (where

| Composition | % in air | TGA at 750° C. Theoretical inorganic residue % | % Carbon remaining in air | % in N₂ % | Carbon yield N₂ theor. residue |
|---|---|---|---|---|---|
| Product IVb acetate (4.0 g) 50% KOH (1.4 g) | 25.9 | 17.6 | 8.3 | 43.3 | 25.7 |
| Product IVb acetate (4.0 g) CaO (0.4 g) Water (0.5 g) | 42.3 | 9.1 | 33.2 | 45.3 | 36.2 |
| Product V formate (4.0 g) CaO (0.75 g) Water (0.5 g) | 16.1 | 12.0 | 4.1 | 51.9 | 39.9 |
| Product V formate (4.0 g) MgO (0.5 g) Water (0.5 g) | 22.0 | 11.1 | 10.9 | 54.4 | 31.1 |

The formate ester behaved in the expected manner yielding mainly MgCO₃ and CaO as ashed residue when pyrolized in air. The acetate ester with CaO gave similar carbon yields in air and nitrogen, indicating better resistance to oxidation. This factor is of great importance in the application of the invention to the manufacture of refractories, bonded carbon electrodes, etc.

A mix wa prepared using:
85 g magnesia
15 g graphite
10 g Product IVb (acetate ester)

and pressed into a cylindrical brick shape at 2 t/inch². The resultant shape was allowed to cure at room temperature for 24 hours then stage post-cured in an oven for 66 hours at 100° C. followed by 24 hours at 150° C. The samples were then heated in a muffle furnace at 850° C. for 5 hours to yield a refractory material.

The samples were similar in appearance to bricks made from a solution of novolak resin in ethylene glycol mixed with hexamine (hexamethylenetetramine) and heat cured.

The advantage of the phenolic resole esters of the invention is that the brick in the unfired state is more stable and stronger than one based on the novolak/-glycol system.

50 is the AFS fineness number) at 18° C. in a high speed Kenwood Chef Mixer for 60 seconds. 9 g of a highly acetylated Product B (this had been prepared according to the procedure set out for Product IVb above except that the reactants used were Product B (135 g), pyridine (22 ml) and acetic anhydride (270 g)) were added to the sand/Resin 1 mixture and mixed for 45 seconds. The mix was then discharged and immediately made into AFS compression test specimens using a standard rammer and precision tubes (The test specimens are cylinders 2 inches in diameter and 2 inches high, armed three times with a 14 pound weight dropped through 2 inches). They were then stored at 20° C./50% relative humidity and after hour and 24 hours, the compression strengths of the test specimens were measured as 1085 kNm⁻² and 3945 kNm⁻², respectively.

Application Example 8 - Use as a Proppant Coating

Following generally the procedure for the preparation of Product C, a resin was prepared at a higher viscosity than that of Product C, with the objective of forming a resin that when cured, would have a melting point in the range of from 220° F. to 240° F. (104° C. to 116° C.). This resin was then converted to the acetate ester, and substantially dehydrated. The resin ester was then mixed for about 30 minutes with sand in the proportion of about 2% by weight of the resin ester based on sand.

The product was sand coated with a binder that could be activated upon contact with an alkaline solution. It is useful for enhancing the characteristics of a subterranean formation for the purpose, for example, of increasing its permeability and thus the productivity of a well situated in the subterranean formation.

In use, the coated sand is placed in or adjacent to formation, and then caused to cure. Curing is effected by passing into contact with the coated sand a solution of an appropriate basic material such as, for example, sodium hydroxide, calcium hydroxide, or the like. Instead of sand granules, the core of the proppant may be a high compression material such as glass beads especially made for that purpose.

What is claimed is:

1. A method of making a cured phenolic resin composition with comprises reacting
   (1) an esterified phenolic compound containing one or more phenolic hydroxyl groups and/or one .or more esterified phenolic hydroxyl groups and further containing one or more esterified methylol groups positioned ortho and/or para to a phenolic hydroxyl group or esterified phenolic hydroxyl group,
   (2) an unesterified phenolic resole resin composition, and
   (3) a base, in the presence of water and/or other polar solvent.

2. The method of claim 1, wherein the esterified phenolic compound is a mononuclear phenol having an aromatic ring to which is attached at least one phenolic hydroxyl group, or an ester thereof containing at least one esterified phenolic hydroxyl group which further contains one or more esterified methylol groups attached to the aromatic ring at a position ortho and/or para to a phenolic hydroxyl group or esterified phenolic hydroxyl group.

3. The method of claim 2, wherein the esterified phenolic compound is selected from the group consisting of esterified methylol-substituted phenol, o-cresol, m-cresol, p-cresol, 3,5-xylen-1-ol, resorcinol, phloroglucinol, Bisphenol A, pyrogallol and mixtures thereof, and esters of these wherein the phenolic hydroxyl group or at least one of the phenolic hydroxyl groups is esterified.

4. The method of claim 3, wherein the esterified phenolic compound is selected from the group consisting of 2-acetyloxymethyl phenol, 2-methacryloyloxymethyl phenol, 2-salicyloyloxymethyl phenol, 2-acetyloxymethyl phenol acetate, 2,6-diacetyloxymethyl p-cresol, 2,6-diacetyloxymethyl p-cresol acetate, 2,4,6-triacetyloxymethyl phenol, 2,4,6-triacetyloxymethyl phenol acetate, 2,6-diacetyloxymethyl phenol acetate, 2,2',6,6'-tetraacetyloxymethyl Bisphenol A, and 2,2',6,6'-tetraacetyloxymethyl Bisphenol A diacetate.

5. The method of claim 1, wherein the esterified phenolic compound comprises an esterified methylol group-containing derivative of a condensation reaction product obtained by reacting two or more molecules of a mononuclear phenol with one or more molecules of a phenol-reactive aldehyde or ketone, wherein the said derivative contains one or more phenolic hydroxyl groups and/or one or more esterified methylol groups positioned ortho and/or para to a phenolic hydroxyl group or esterified phenolic group.

6. The method of claim 5, wherein the esterified phenolic compound comprises an esterified methylol group-containing derivative of a condensation reaction product obtained by reacting formaldehyde and a mononuclear phenol selected from the group consisting of phenol, o-,m-,or p-cresol, 3,5-xylen-ol, resorcinol, phloroglucinol, pyrogallol and mixtures thereof, wherein the said derivative contains one or more phenolic hydroxyl groups and/or one or more esterified phenolic hydroxyl groups and contains one or more esterified methylol groups positioned ortho and/or para to a phenolic hydroxyl group or esterified phenolic hydroxyl group.

7. The method of claim 6, wherein the esterified phenolic compound is an esterified or partially esterified phenol-formaldehyde resole resin.

8. The method of claim 7, wherein the esterified phenolic compound contains one or more acetyloxymethyl groups or formyloxyethyl groups positioned ortho and/or para to a phenolic hydroxyl group or esterified phenolic hydroxyl group.

9. The method of claim 1, wherein the base is an alkali selected from the oxides and hydroxides of lithium, sodium, potassium, calcium and magnesium.

10. The method of making a cured phenolic resin composition which comprises reacting
    (1) an esterified phenolic compound comprising an esterified methylol group-containing derivative of a condensation reaction product obtained by reacting two or more molecules of a mononuclear phenol with one or more molecules of a phenol-reactive aldehyde or ketone, wherein the said derivative contains one or more phenolic hydroxyl groups and/or one or more esterified phenolic hydroxyl groups and contains one or more esterified methylol groups positioned ortho and/or para to a phenolic hydroxyl group or esterified phenolic hydroxyl group, and
    (2) a base, in the presence of water and/or other polar solvent.

11. The method of claim 10, wherein the esterified phenolic compound comprises an esterified methylol group-containing derivative of a condensation reaction product obtained by reacting formaldehyde and a mononuclear phenol selected from phenol, o-,m- or p-cresol, 3,5-xylen-1-ol, resorcinol, phloroglucinol and pyrogallol, wherein the said derivative contains one or more phenolic hydroxyl groups and/or one or more esterified phenolic hydroxyl groups and contains one or more esterified methylol groups positioned ortho and/or para to a phenolic hydroxyl group or esterified phenolic hydroxyl group.

12. The method of claim 11, wherein the esterified phenolic compound is an esterified or partially esterified phenol-formaldehyde resole resin.

13. The method of claim 10, wherein the esterified phenolic compound contains one or more acetyloxymethyl groups or formyloxymethyl groups positioned ortho and/or para to a phenolic hydroxyl.group or esterified phenolic hydroxyl group.

14. The method of claim 10, wherein the base is selected from the group consisting of calcium oxide, calcium hydroxide, magnesium oxide and magnesium hydroxide.

15. The method of claim 10, wherein a substantially anhydrous base and a substantially anhydrous esterified phenolic compound are mixed together to form a mixture which undergoes reaction to form a cured phenolic resin composition on the further treatment thereof with moisture.

16. The method of claim 15, wherein a substantially anhydrous homogeneous mixture of granular refractory material, base and esterified phenolic compound is prepared, shaped in a vented mould or core box and then steam or water vapor is passed into the shaped esterified phenolic compound so components of the mixture react to form a cured phenolic resin which binds the granular refractory material.

17. The method of claim 15, wherein a substantially anhydrous homogeneous mixture of base and esterified phenolic compound is applied, as a coating, on a substrate and the coated substrate is allowed to stand in a humid atmosphere for a period sufficient to enable the base and esterified phenolic compound to react in the presence of moisture to produce a cured phenolic resin composition.

18. The method of claim 15, wherein a mixture of base, esterified phenolic compound and blowing agent is prepared, water is then added to the mixture and the mixture then formed to produce a cured phenolic foam.

19. The method of claim 10, wherein a substantially anhydrous esterified phenolic compound is mixed with granular refractory material and the resulting mixture is then treated with an aqueous solution of the base, whereupon the esterified phenolic compound and the base react together to form a cured phenolic resin composition which binds the granular refractory material.

20. A method of using a chemical precursor to form a phenolic resin, wherein forming of said phenolic resin comprises reacting:
  (1) said chemical precursor; and
  (2) a base in the presence of water and/or other polar solvent,
wherein said chemical precursor is an esterified phenolic compound comprising an esterified methylol group-containing derivative of a condensation reaction product obtained by reacting two or more molecules of a mononuclear phenol with one or more molecules of a phenol-reactive aldehyde or ketone, wherein the said derivative contains one or more phenolic hydroxyl groups and/or one or more esterified phenolic hydroxyl groups and contains one or more esterified phenolic hydroxyl groups and contains one or more esterified methylol groups positioned ortho and/or para to a phenolic hydroxyl groups or esterified phenolic hydroxyl group.

21. The method of using of claim 20, wherein the base is a alkaline earth metal compound selected from the group consisting of calcium oxide, calcium hydroxide, magnesium oxide and magnesium hydroxide.

22. The method of making a cured phenolic resin composition having reduced inorganic ion content which comprises reacting
  (1) an esterified phenolic compound comprising an esterified methylol group-containing derivative of a condensation reaction product obtained by reacting two or more molecules of a mononuclear phenol with one or more molecules of a phenol-reactive aldehyde or ketone, wherein the said derivative contains one or more phenolic hydroxyl groups and/or more esterified phenolic hydroxyl groups and contains one or more esterified methylol groups positioned ortho and/or para to a phenolic hydroxyl group or esterified phenolic hydroxyl group, and
  (2) a Mannich base.

23. The method of claim 22, wherein the Mannich base is 2,4,6-tris (dimethylaminomethyl) phenol.

24. The method of claim 22, wherein the esterified phenolic compound is a phenol-formaldehyde resole resin at least partially acetylated or at least partially formulated.

25. A derivative formed by esterification of a condensation reaction product wherein the condensation reaction product is obtained by reacting two or more molecules of a mononuclear phenol selected from the group consisting of pehnol, o-cresol, m-cresol, p-cresol, 3-5-xylene-1-ol, resorcinol, phloroglucinol and pyrogallol with one or more molecules of a phenol-reactive aldehyde or ketone and wherein said derivative formed by the esterification of said condensation reaction product contains one or more esterified methylol groups attached ortho and/or para to a phenolic hydroxyl group or esterified methylol groups, wherein one or more of the esterfied methylol groups contains a carboxylic acid ester group selected from the group consisting of formate, acetate, acetoacetate, acrylate, propionate, lactate, crotonate, methacrylate, butyrate, isobutyrate, caproate, caprylate, benzoate, toluate, p-aminobenzoate, cinnamate, laurate, myristate, oxalate, succinate, fumarate, maleate, adipate, azelate, sebacate, and groups of the formula

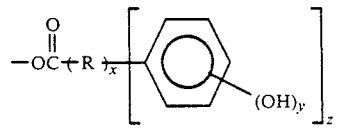

wherein R is a saturated linear or branched lower hydrocarbyl group, $x=0$ or 1, $y=1$ to 3 and $z=1$ or 2, such that when $x=0$, $z=1$, which derivative undergoes crosslinking on reaction with a base in the presence of water and/or other polar solvent.

26. A phenolic composition comprising
  (1) an esterified phenolic compound containing one or more phenolic hydroxyl groups and/or one or more esterified phenolic hydroxyl groups and further containing one or more esterified methylol groups positioned ortho and/or para to a phenolic hydroxyl group or esterified phenolic hydroxyl group,
  (2) an unesterified phenolic resole resin composition, and
  (3) a base,
wherein said phenolic composition undergoes reaction in the presence of water and/or other polar solvent to produce a cured phenolic resin composition.

27. The composition of claim 26, wherein the esterified phenolic compound is a mononuclear phenol having an aromatic ring to which is attached at least one phenolic hydroxyl group, or an ester thereof containing at least one esterified phenolic hydroxyl group which further contains one or more esterified methylol groups attached to the aromatic ring at a position ortho and/or para to a phenolic hydroxyl group or esterified phenolic hydroxyl group.

28. The composition of claim 27, wherein the esterified phenolic compound is selected from the group consisting of esterified methylol-substituted phenol, o-cresol, m-cresol, p-cresol, 3,5-xylen-1-ol, resorcinol, phloroglucinol, Bisphenol-A, pyrogallol and mixtures thereof, and esters of these wherein the phenolic hydroxyl group or at least one of the phenolic hydroxyl groups is esterified.

29. The composition of claim 28, wherein the esterified phenolic compound is selected from the group consisting of 2-acetyloxymethyl phenol, 2-methacryloyloxymethyl phenol, 2-salicyloyloxymethyl phenol, 2-acetyloxymethyl phenol acetate, 2,6-diacetyloxymethyl p-cresol, 2,6-diacetylox-ymethyl p-cresol acetate, 2,6-diacetoacetyloxymethyl p-cresol, 2,4,6-triacetyloxymethy 1 phenol, 2,4,6-triacetyloxymethyl phenol acetate 2,6-diacetyloxymethyl phenol acetate 2,2',6,6'-tetraacetyloxymethyl Bisphenol A, and 2,2$^1$,6,6$^1$- tetraacetyloxymethyl Bisphenol A diacetate.

30. The composition of claim 26, wherein the esterified phenolic compound comprises an esterified methylol group-containing derivative of a condensation reaction product obtained by reacting two or more molecules of a mononuclear phenol with one or more molecules of a phenol-reactive aldehyde or ketone, wherein the said derivative contains one or more phenolic hydroxyl groups and/or one or more esterified methylol groups positioned ortho and/or para to a phenolic hydroxyl group or esterified phenolic group.

31. The composition of claim 30, wherein the esterified phenolic compound derivative of a condensation reaction product obtained by reacting formaldehyde and a mononuclear phenol selected from the group consisting of phenol, o-,m-, or p-cresol, 3,5-xylen-1-ol, resorcinol, phloroglucinol, pyrogallol and mixtures thereof, wherein the said derivative contains one or more phenolic hydroxyl groups and/or one or more esterified phenolic hydroxyl groups positioned ortho and/or para to a phenolic hydroxyl group or esterified phenolic hydroxyl group.

32. The composition of claim 31, wherein the esterified phenolic compound is an esterified or partially esterified phenol-formaldehyde resole resin.

33. A composition of claim, 30, wherein in esterified phenolic compound contains one or more acetyloxymethyl groups or formyloxymethyl groups positioned ortho and/or para to a phenolic hydroxyl group or esterified phenolic hydroxyl group.

34. A composition of claim 26, wherein the base is an alkali selected from the group consisting of oxides and hydroxides of lithium, sodium, potassium, calcium and magnesium.

35. A phenolic resin composition comprising a mixture of:
(1) an esterified phenolic compound comprising a derivative formed by esterifying the condensation reaction product obtained by reacting two or more molecules of a mononuclear phenol with on or more molecules of a phenol-reactive aldehyde or ketone, wherein said derivative contains one or more phenolic hydroxyl groups and/or more esterified phenolic hydroxyl groups and contains one or more esterified methylol groups positioned ortho and/or para to a phenolic hydroxyl group or esterified phenolic hydroxyl group, and
(2) a base, wherein said phenolic resin composition in the presence of water and/or other polar solvent undergoes reaction to produce a cured phenolic resin composition.

36. The composition of claim 35, wherein the esterified phenolic compound comprises an esterified methylol group-containing derivative of a condensation reaction product obtained by reacting formaldehyde and a mononuclear phenol selected from the group consisting of phenol, o-,m-, or p-cresol, 3,5-xylen-1-ol, resorcinol, phloroglucinol, pyrogallol or a mixture thereof, wherein the said derivative contains one or more phenolic hydroxyl groups and/or one or more esterified phenolic hydroxyl groups and contains one or more esterified methylol groups positioned ortho and/or para to a phenolic hydroxyl group or esterified phenolic hydroxyl group.

37. The composition of claim 36, wherein the esterified phenolic compound is an esterified or partially esterified phenol-formaldehyde resole resin.

38. The composition of claim 37, wherein the esterified phenolic compound contains one or more acetyloxymethyl groups of formyloxymethyl groups positioned ortho and/or para to a phenolic hydroxyl group or esterified phenolic hydroxyl group.

39. The composition of claim 35, wherein the base is selected from the group consisting of calcium oxide, calcium hydroxide, magnesium oxide and magnesium hydroxide.

40. The composition of claim 26, which additionally contains a blowing or foaming agent.

41. The composition of claim 35, which additionally contains a blowing or foaming agent.

42. A foundry moulding composition comprising a mixture of a major amount of granular refractory material and a minor amount effective to bind the granular refractory material of a phenolic resin composition of claim 26.

43. A foundry moulding composition comprising a mixture of a major amount of granular refractory material and a minor amount effective to bind the granular refractory material of a phenolic resin composition of claim 35.

44. A composition of claim 42 which additionally contains a silane coupling agent.

45. A composition of claim 43 which additionally contains a silane coupling agent.

* * * * *